Sept. 1, 1936. E. W. KRONBACH 2,052,574
ART OF FORMING, REFRIGERATING, AND HARVESTING FROZEN CONFECTIONS
Filed Feb. 13, 1933 2 Sheets-Sheet 1

INVENTOR
Edwin W. Kronbach
BY
ATTORNEY

Sept. 1, 1936. E. W. KRONBACH 2,052,574
ART OF FORMING, REFRIGERATING, AND HARVESTING FROZEN CONFECTIONS
Filed Feb. 13, 1933 2 Sheets-Sheet 2
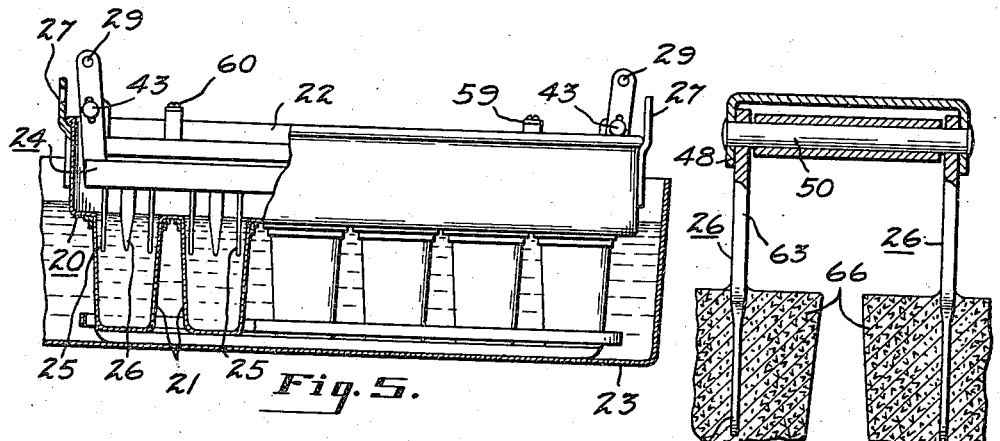
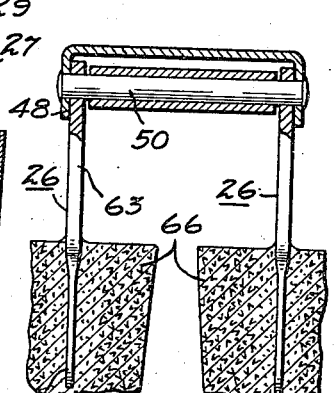
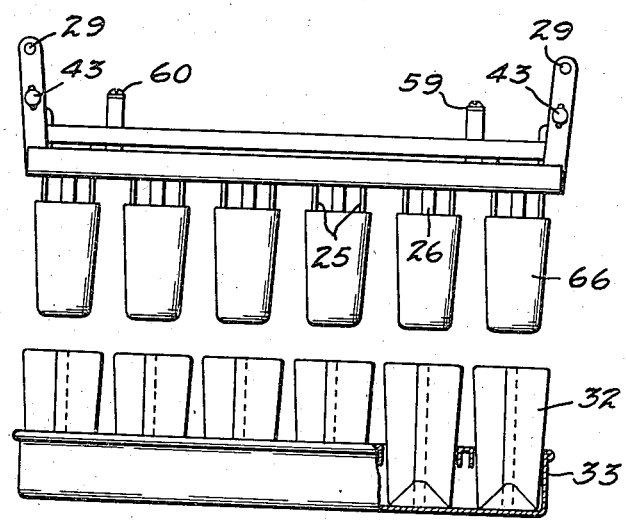
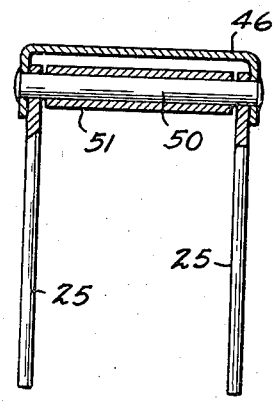
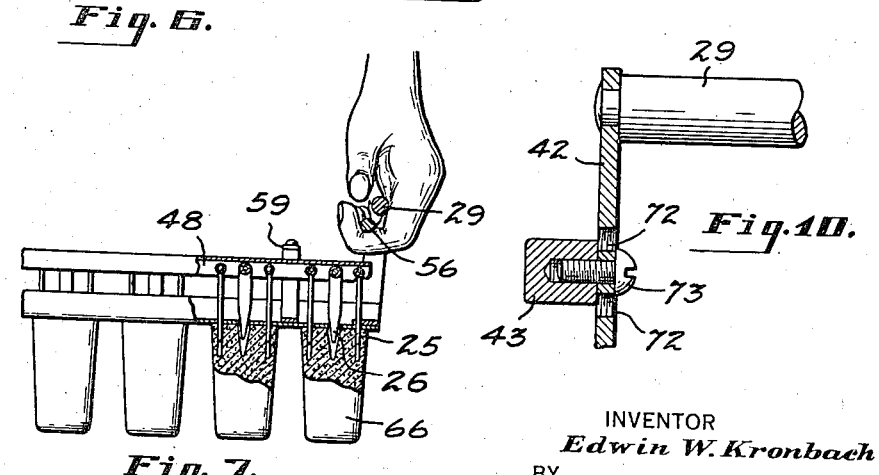
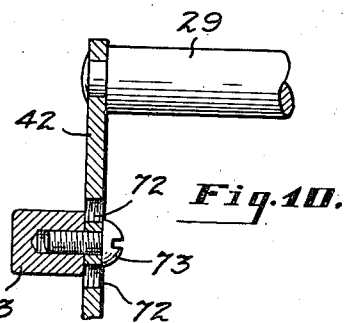
INVENTOR
Edwin W. Kronbach
BY
ATTORNEY Patented Sept. 1, 1936

2,052,574

UNITED STATES PATENT OFFICE 2,052,574

ART OF FORMING, REFRIGERATING, AND HARVESTING FROZEN CONFECTIONS

Edwin W. Kronbach, Cleveland, Ohio, assignor, by mesne assignments, to Joe Lowe Corporation, a corporation of Delaware Application February 13, 1933, Serial No. 656,525

13 Claims. (Cl. 107—19).

The present invention relates to the art of forming, refrigerating and harvesting frozen confections such as flavored syrups, water ices, sherbets, custards, ice creams and the like and one of the objects of the present invention is to provide an improved method of and apparatus for forming, refrigerating and harvesting such confections.

In carrying out the above object, it is a further object of the invention to freeze a pin or peg in the confection, while the confection is being frozen in a mold, and so position the peg that it is tightly bonded with the confection quickly and before the entire mass is frozen rigidly whereby the peg can be utilized to withdraw the confection from the mold as soon as the mass has hardened to the state of self-stability.

Another object of the invention is to provide improved method of an apparatus for forming, refrigerating and harvesting a frozen confection having an opening therein. In accordance with the present invention, the opening in the frozen confection is formed by positioning an insert or core in the confection while the latter is being refrigerated. If the insert is permitted to remain in the confection until the entire mass is rigid throughout, the insert is bonded to the confection to such degree that it is difficult to remove the same. Accordingly, it is an object of this invention to freeze a pin or peg in the confection, while the confection is being frozen, and so position the peg that it is tightly bonded with the confection before the mass of confection, about the insert, is frozen rigidly whereby the peg, which is small in surface area and therefore can be readily disengaged from the confection after the confection is removed from the mold, can be utilized for withdrawing the confection from the mold.

Further objects and advantages will be apparent from the following description, reference being had to the accompanying drawings, wherein a preferred form of embodiment is clearly shown.

In the drawings:

Fig. 5 is a side view, partly in section of a mold in a brine tank and the lifter rack in position therein;

Fig. 6 is a side view of the lifter rack and a bag rack partly in section, the lifter rack being shown in position for inserting confections into the bags or containers;

Fig. 7 is a fragmentary sectional view partly in section showing one stage of operation of the same;

Figure 1:
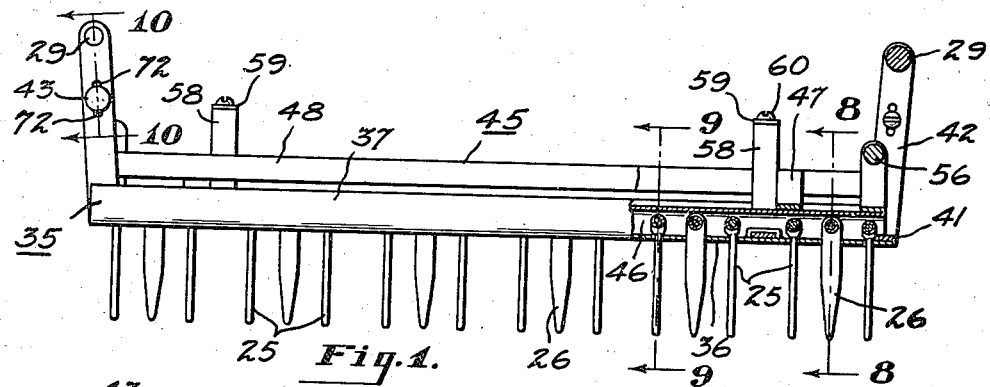
Fig. 1 is a side view, partly in section, showing a lifter rack.
Figure 2:
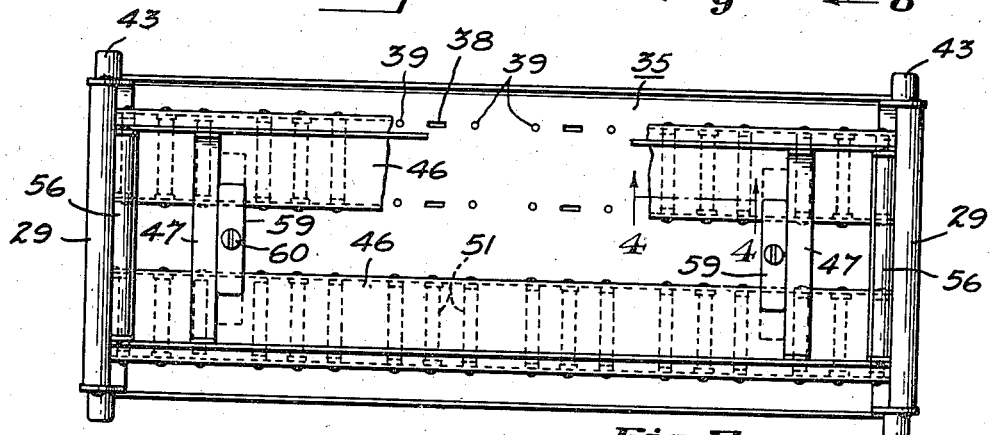
Fig. 2 is a top plan view of the lifter rack with parts broken away.

Figs. 8, 9 and 10 are sectional views taken on line 8—8, 9—9, and 10—10 respectively of Fig. 1.

Referring to the drawings in general and particularly to Fig. 5, there is provided a mold structure 20 including a plurality of individual molds 21, which depend from a receptacle 22. The material to be frozen into frozen confections is poured into the receptacle 22 to fill the individual molds 21. If a mix such as an ice cream mix is to be frozen, a squeegee (not shown) may be provided for leveling the material even with the tops of the individual molds. The molds are suitably refrigerated, as for example by inserting the same in a refrigerated brine tank 23 to cause the freezing of the material. Prior to the solidification of the material and preferably at the time the material is placed into the mold, a lifter rack such as that shown at 24 is inserted into the mold structure 20. The pegs or pins of the lifter rack are arranged in sets and each set includes two pegs 25. The pegs of a set each have the lower end thereof immersed in the confection in a mold. An insert or core 26 is provided for each individual mold and is interposed between the pegs 25 of a set. After the material is frozen, the mold structure is removed from the brine tank and the bond between the frozen confections and the mold is broken by inserting the mold structure 20 momentarily into a defrosting tank (not shown) containing warm water.

Handles 27 are provided on the mold structure 20 for manipulating the same during the defrosting operation. During this operation the surface of the frozen confections is melted only slightly but sufficiently to break the bond between the confections and the molds. The confections clinging to the pegs 25 and cores 26 can be withdrawn from the mold 21 by lifting upwardly on the lifter rack 24 by handles 29 provided for this purpose. It is often desirable to coat the frozen confections with a coating, such as for example, chocolate. The lifter rack 24 may be utilized for manipulating or holding the confections while such a coating is being applied, and preferably this coating is applied by dipping the confections into a tank (not shown) containing a bath of coating material. After the coatings are hardened on the confections, by being congealed by the latent refrigeration in the frozen confections, they are removed mechanically from the pegs 25 and the cores 26 and may be dropped directly into bags 32 carried by a rack 33 (see Fig. 6).

The core 26 thus provides a frozen confection having an opening. The core may vary in size or shape according to what it is desirable to place in the opening. If another confection is to be inserted in the opening, it will be understood that a larger core would be used than that herein shown. In the present illustration, the core 26 is of a size to form an opening for receiving a handle stick.

Referring in detail to the drawings, there is shown a grid structure 35, including a flat plate 36 having upwardly extending side walls 37. The plate 36 is provided with four rows of aligned slots 38 and holes 39, each row including 6 slots and 12 holes. The slots and holes are also arranged in sets each set includes two holes 39, for receiving pegs 25, and an interposed slot 38 for receiving a spur 26. Frames are carried at the opposite ends of the plate 36 and each frame including uprights 42 connected at the upper ends by handle bars 29 by which the entire peg assembly may be manipulated. Studs 43 are carried by the uprights 42 and are arranged to rest upon the upper edge of the mold structure 20 so as to properly space the lifter rack in the mold structure and thereby limit the depth to which the pegs 25 and the spurs 26 may extend.

The rack 45, carrying the pegs 25 and spurs 26, includes two inverted channel irons 46 which are fastened together by tie strips 47. Downwardly extending side walls 48 of the channel irons 46 carry pins 50 (see Figs. 8 and 9) and each pin carries either two pegs 25 or two spurs 26. These spurs and pegs are loosely mounted upon the pins 50 and sleeves 51 on the pins 50 limit the sidewise movement of the pegs or spurs, as the case may be. Frames 53 are provided at opposite ends of the channel irons 46 and the bases 54 thereof provide tie strips attached to the channel irons 46. The frames 53 also include uprights 55 to the upper ends of which are attached handle bars 56. It will be noted that the handle bars 56 are placed close enough to the handle bars 29 so that the operator may grasp both with one hand as shown in Fig. 7, and, the corresponding handle bars 52 and 29 on the opposite end of the assembly are likewise so positioned. When the operator closes his hands, the peg and spur rack will be pulled upwardly causing the pegs 25 and the spurs 26 to be moved upwardly through the holes 39 and slots 38 respectively in the plate 36. Upwardly extending posts, in the form of strip metal 58, are carried by the plate 36 and the upper ends thereof carry strips which form flanges 59 held in place by screws 60. These flanges 59 lie in the path of movement of the channels 46 and limit the upward movement of the peg and spur rack so as to prevent the pegs 25 and the spurs 26 from being withdrawn from the holes 39 and slots 38 and the plate 36. It will be noted that the tie strips 47 are placed relatively close to the posts 58 and thereby limit the sidewise movement of the peg and spur rack. The peg and spur structure also includes longitudinally disposed metal strips 61 which are connected to the uprights 55 and form braces.

The studs 43 on the uprights 42, in resting upon the top of the mold structure 20, permit the pegs 25 and the spurs 26 to immerse only partly within the confection whereby the upper parts of the spurs are bare. It will be noted (see Fig. 8) that the upper parts 63 of the spurs 26 are thicker than the lower parts 64. These upper parts 63 fit snugly within the slots 38 of the plate 36, so that the walls forming the slots 38, will wipe the upper parts 63 clean of any material clinging thereto as they are moved through the slots. The lower parts 64 of the spurs 26 being thinner than the part 63 will fit loosely in the slots 38. Because of these loose connections of the spurs 26 with the pins 50 and because of the narrowing of the lower parts 64 of the spurs, the spurs 26 may be bent considerably out of line before there is any tendency to bind in the slots 38. The pegs 25 are made of relatively small gauge wire and can be easily straightened when bent from normal. However the connection of these pegs and the pins 50 are also loose so that the pegs must be bent considerably out of line before there is any tendency to bind in the holes 39. If desired, the pegs 25 can be made of such small gauge wire that, if bent from normal, they will straighten sufficiently, at least temporarily, to pass through the openings 38 by merely pulling same through the openings in the normal operation of the device. It will be noted that there is a space between the individual molds 21 so that brine will surround the individual molds. Therefore the freezing and solidifying of the confection 66 will be inwardly, that is the freezing and solidifying will first take place adjacent the outer surface of the confection and the freezing and solidifying will progress inwardly. It is not necessary to maintain the molds in the brine tank until the entire mass of confection is frozen to a state in which the confection is solidified and not pliable. In mass production it is desirable to remove the confection from the brine tank as soon as the confection has been hardened to a state of self stability. When the confection is in that state, the outer part 67 indicated by check type shading is frozen solid while the center 68 part thereof is still in a pliable condition. In order to remove the confections from the molds while the confection is in the latter state, I have arranged the pegs 25 so that they will extend into that zone which is first to freeze, namely, relatively close to the side walls of the confection and by so doing I positioned the pegs so that a tight bond is provided between the same and the confection while the center of the confection is still in a pliable state.

The improved method and apparatus herein shown and described affords certain advantages among which are speed of production and ease of removal of the confection from the molds. By positioning the pins 25 with respect to the molds, as herein shown, it is not necessary to continue refrigeration of the confection in the mold until the entire mass is rigid or hard throughout. It is necessary only to maintain the confection in the mold long enough to solidify a part thereof, that is, long enough to bond the pins sufficiently so that they may be used to withdraw the confection from the mold after the bond between the mold and confection is broken by momentarily dipping the mold in warm water. Thus the time necessary for forming a set of confections is relatively short and in this manner the apparatus can be reused quickly and therefore the output of an apparatus is materially increased. The bonding surface of the pins being small, the bond between the confection and pins can be readily broken by the apparatus shown. Furthermore, by practising the method herein disclosed, a confection with a relatively large opening can be molded and readily removed from the mold. By positioning the pins 25 as herein shown, they are bonded sufficiently tight to the confection for removing the confection from the mold before the core is tightly bonded with the confection. This is particularly true when the method is practised with a relatively low refrigerating temperature. If the confection is withdrawn from the mold within a reasonable time, from the proper computed time, the bond, if any, between the core and confection is such that it can be readily broken by the apparatus herein shown. In this manner a relatively large core can be used without the danger of the core bonding with the confection to such an extent that it cannot be removed without melting the bond or cracking the confection.

The spur 26 herein shown and described sets forth one use of a core, namely; that of coring a hole adapted to receive a handle stick but it is to be understood that cores of various shapes and sizes could be used depending upon what is to be inserted into the confection. It is also to be understood that instead of a slot such as 39, the opening in plate 36 should conform to the shape of the core and in all cases, the core should fit snugly in order to wipe off any material clinging to the core.

After the confections are withdrawn from the molds and the pins and cores are withdrawn from the confections, the confections are placed in a storage or hardening room. If desirable the material to be placed in the cored hole may be placed therein before the confection is placed in the storage or hardening room. One advantage of following this practice is that the material inserted is readily bonded with the confection because the center parts of the confections will harden in said room. Also, in the specific illustration, the center part of the confection is somewhat pliable when the confections are withdrawn from the molds and therefore the handle sticks can be readily inserted. In fact, the cored opening can be somewhat smaller than the stick so that the confection engages all parts of the inserted part of the stick. Then, when the confections are further refrigerated in the storage room, a thorough bond is insured between the sticks and confection.

Figures 3, 4:
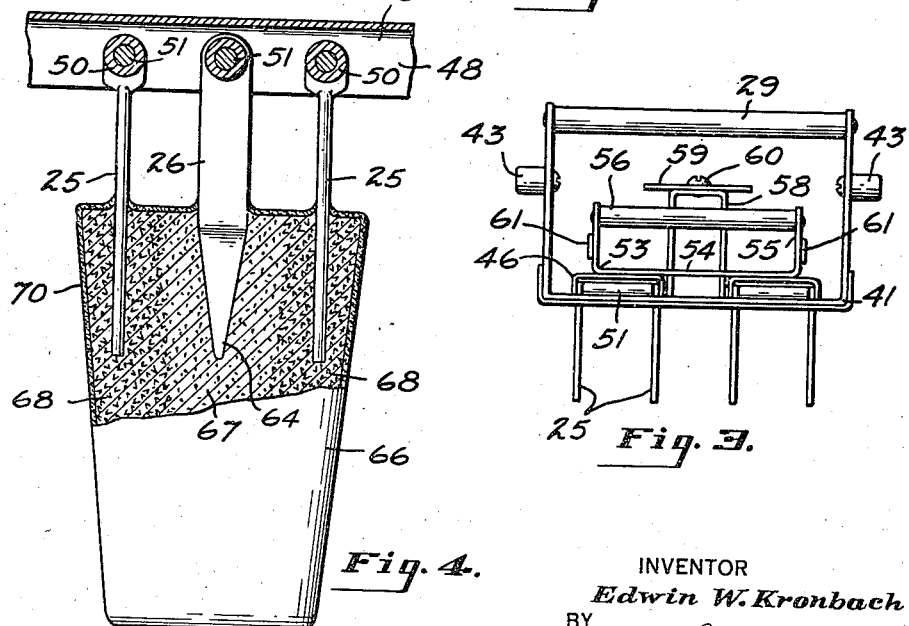
Fig. 3 is an end view of the lifter rack.
Fig. 4 is a fragmentary sectional view taken on line 4—4 of Fig. 2.

If it is desirable to coat the confection as for example with chocolate, it is coated while it is carried by the pins 25. This coating will immediately harden due to the latent refrigerating effect of the cold confection. It will be noted that the enlarged portion 63 of spur 26 extends only a short distance into the confection 66 (see Figs. 4 and 8). Therefore, when the pins 25 and spur 26 are withdrawn from the confection, the opening in the chocolate coating and in the top of frozen mass will be somewhat larger than the lower part of the opening. The stick to be inserted in this opening is preferably a trifle smaller than the opening in the chocolate coating 70 and the mouth of the opening in the confection so as not to break the coating when inserting the stick but the stick is somewhat larger than the lower part of the opening in the confection so that all sides of the stick engage the confection.

I have found that the bond between the pins 25 and the confection varies considerably in accordance with the temperature of the brine. For example, in freezing the confection by a 0° F. brine, the pins 25 and cores 26 can be withdrawn from the confection although the entire mass is frozen solidly throughout but if the pins and cores are frozen to the same depth in the confection while refrigerating the same in a minus 20° F. brine, it is very difficult to withdraw the pins and cores therefrom. In ice cream factories brine temperatures are usually maintained between minus 20° F and 0° F. I have found that by arranging the apparatus so that the depth to which the pegs and cores can extend into the confection, my device can be used for either extreme or any intermediate temperature of brine. This I accomplish by making the stops 43 adjustable. Three holes 72 at different heights are provided in each upright 42. (See Fig. 10). The stops 43 are shown in the intermediate position. If the apparatus is to be used with, for example, minus 20° F. brine, the stops 43 are lowered and held in place by the screws 73 extending through the lowest holes in uprights 42. When the lifter rack 24 is inserted in the mold 20, the stops, engaging the top of the mold limits the depth to which the cores and pins can be inserted. Therefore, the bonding surface between the pins, core and confection is reduced. I have found that although the mold was maintained in the brine tank at a relatively low temperature for an excessive length of time, in fact long enough to thoroughly freeze the entire mass, nevertheless, the pins and cores could be withdrawn without cracking the confection provided of course that the stops 43 were in proper position. Thus by this adjustable provision, the apparatus can be used with different temperature brines and the pins and cores can be removed although the molds are permitted to remain in the brine for a period longer than that necessary to provide a withdrawing bond between the pins and confection. It will of course be understood that in mass production, it is desirable to reuse the apparatus including the molds as quickly as possible. Therefore, in a relatively warm brine, the stops are placed in their highest position so that the pins and cores extend farther into the confection so as to increase the bonding surface of the pins and cores.

The lower part 64 of the spur or core 26 is tapered so that the handle stick must be pushed into position and thereby insure intimate contact of the confection and the stick. Also, the part 64 is tapered for preventing the breaking of the confection at the time the core is withdrawn. If the core is not tapered and when a part of the confection tends to cling, in the form of a knob, to the core, this knob portion would tear the confection or chocolate coating or cause the same to break when withdrawing the core, with the knob bonded thereto, from the confection. However by providing a cored hole which increases in cross sectional area toward the top, any knobs of confection clinging to the core can readily pass through the enlarged upper hole. When using a tapered core, as herein shown, without the pins 25, it has been found that if the confection is somewhat pliable at the core, it will not maintain its position on the core and is apt to fall from the core when the lifter rack is manipulated as for example during the coating operation. By using the pins 25 as herein shown, this trouble is eliminated.

It will be noted that the guiding tie strips 47 and posts 58 are disposed adjacent one another and each set of strips 47 and posts 58 are disposed near the opposite ends of the rack. By this arrangement the opposite ends of the channel irons 46 must be pulled upwardly simultaneously to prevent binding between a strip and a post and the arrangement is such that the channel irons can be raised to such an extent that only a small part of each pin and core protrudes below the plate 36 so as to insure the dropping of the confection but the channel irons cannot be cocked to such an angle that the pins and core can be withdrawn from their respective holes in plate 36.

While the form of embodiment of the present invention as herein disclosed constitutes a preferred form, it is to be understood that other forms might be adopted all coming within the scope of the claims that follow.

I claim:

1. The method of forming, refrigerating and harvesting a frozen confection having a recess which method consists in filling a mold, freezing the lower end of a peg in the confection and forming a recess in the outer surface of the confection, breaking the bond between the confection and mold before the mass of confection is frozen solidly adjacent the recess, and then withdrawing the confection from the mold by the peg.

2. The method of forming, refrigerating and harvesting a frozen confection having a recess which method consists in filling the mold, applying a refrigerating medium to the periphery of the mold so as to solidify the body of the confection inwardly and freeze the lower end of a peg in the outer part of the confection and forming an opening in the center of the confection, breaking the bond between the confection and mold after the peg is tightly bonded with the confection but before the center is rigidly frozen adjacent the recess, and then withdrawing the confection from the mold by the peg.

3. The method of forming, refrigerating and harvesting a frozen confection having a recess which method consists in filling the mold, freezing the lower end of a peg in the confection and forming a recess in the outer surface of the confection, breaking the bond between the confection and mold before the mass of confection is frozen solidly adjacent the recess, then withdrawing the confection from the mold by the peg, removing the peg from the confection and inserting a handle stick in the recess.

4. The method of forming, refrigerating and harvesting a frozen confection having a recess which method consists in filling the mold, freezing the lower end of a peg in the confection and forming a recess in the outer surface of the confection, breaking the bond between the confection and mold before the mass of confection is frozen solidly adjacent the recess, then withdrawing the confection from the mold by the peg, removing the peg from the confection and inserting a handle stick in the recess, and then subjecting the confection to a refrigerating temperature to solidify the entire confection and thoroughly bond the confection and handlestick.

5. The method of forming, refrigerating, and harvesting a frozen confection having a recess which method consists in filling the mold, applying a refrigerating medium to the periphery of the mold so as to solidify the body of the confection inwardly, freezing the lower end of a peg in the outer part of the confection and forming a recess in the center of the confection, breaking the bond between the confection and mold after the peg is tightly bonded with the confection but before the confection is rigidly frozen adjacent the recess, then withdrawing the confection from the mold by the peg, removing the peg from the confection and inserting a handle stick in the opening formed by the core.

6. The method of forming, refrigerating, and harvesting a frozen confection having a recess which method consists in filling the mold, applying a refrigerating medium to the periphery of the mold so as to solidify the body of the confection inwardly, freezing the lower end of a peg in the outer part of the confection and forming an opening in the center of the confection, breaking the bond between the confection and mold after the peg is tightly bonded with the confection but before the center is rigidly frozen, then withdrawing the confection from the mold by the peg, inserting a handle stick in the recess and then subjecting the confection to a refrigerating temperature to solidify the center thereof and thoroughly bond the confection and handle stick.

7. A portable carrier for withdrawing a frozen confection from a mold in which it was frozen comprising a rack having spaced handles for manipulating the same, a withdrawing peg attached to the rack and adapted to be disposed intermediate the center of the confection and the outer edge thereof and frozen therein, and a core for forming a central opening in the frozen confection, said core also being attached to said rack.

8. A portable carrier for withdrawing a frozen confection from a mold in which it was frozen comprising a rack having spaced handles for manipulating the same, a plurality of withdrawing pegs attached to the rack and adapted to be frozen to the confection, and a core for forming an opening in the frozen confection, said core being interposed between the pegs and attached to said rack.

9. In a refrigerating device, the combination with a mold structure having a plurality of molds adapted to contain confection material to be frozen, mechanism for forming forming frozen confections of the type in which each has an opening, and for withdrawing the frozen confections from the molds in which they are frozen comprising, a grid structure having openings, a peg structure including a plurality of pegs and a plurality of cores, said pegs and cores extending downwardly and through the openings in the grid structure, said pegs and cores being arranged in sets, one set for each mold and each set including at least one peg and one core, the lower ends of the peg and core of a set adapted to extend into a mold, the peg of a set and the core of said set providing means for withdrawing the confection from the mold in which it is frozen and for forming a cored opening respectively, said structures being movable toward one another for causing engagement of the tops of the confections and the lower side of the grid structure whereby to break the bond between the pegs and confections.

10. In a refrigerating device, the combination with a mold structure having a plurality of molds adapted to contain confection material to be frozen, mechanism for forming frozen confections of the type in which each has an opening, and for withdrawing the frozen confections from the molds in which they are frozen comprising, a grid structure having openings, a peg structure including a plurality of pegs and a plurality of cores, said pegs and cores extending downwardly and through the openings in the grid structure, said pegs and cores being arranged in sets, one set for each mold and each set including a plurality of pegs and an interposed core, the lower ends of the pegs and the core of a set each adapted to extend into a mold, the pegs of a set and the core of said set providing means for withdrawing the confection from the mold in which it is frozen and for forming a cored opening respectively, said structures being movable toward one another for causing engagement of the tops of the confections and the lower side of the grid structure whereby to break the bond between the pegs and confections.

11. In a refrigerating device, mechanism for forming frozen confections of the type in which each has an opening, and for withdrawing the frozen confections from the molds in which they are frozen comprising, a grid structure having openings, a peg structure including a plurality of pegs and a plurality of cores, said pegs and cores extending downwardly and through the openings in the grid structure, said pegs and cores being arranged in sets and each set including at least one peg and one core, the lower ends of the peg and core of a set each adapted to extend into a mold, the peg of a set and the core of said set providing means for withdrawing the confection from the mold in which it is frozen and for forming a cored opening respectively, said structures being movable toward one another for causing engagement of the tops of the confections and the lower side of the grid structure whereby to break the bond between the pegs and confections, the walls forming the openings in the grid structure closely embracing the pegs and cores, and said pegs and cores being loosely attached to the grid structure for ready alignment with the openings in the grid structure.

12. A portable carrier for withdrawing a plurality of confections simultaneously from a mold in which they were frozen comprising a rack having spaced handles for manipulating the same, a plurality of withdrawing pegs attached to the rack and adapted to be frozen into the confections, and adjustable means for varying the spacing of the rack from the mold thereby to limit the depth to which the pegs can be inserted into the molds.

13. A portable carrier for withdrawing a plurality of confections simultaneously from a mold in which they were frozen comprising a rack having spaced handles for manipulating the same, a plurality of withdrawing pegs attached to the rack and adapted to be frozen into the confections, a core for forming an opening in the frozen confection, said core being interposed between the pegs and attached to the rack, and adjustable means mounted on said handles for limiting the depth to which the pegs and core can be inserted into the molds.

EDWIN W. KRONBACH.